United States Patent
Shirshova et al.

(10) Patent No.: US 9,441,147 B2
(45) Date of Patent: *Sep. 13, 2016

(54) HYBRID CEMENT SET-ON-COMMAND COMPOSITIONS

(75) Inventors: Natasha Shirshova, London (GB); Alexander Bismarck, London (GB); Angelika Menner, London (GB); Gary Funkhouser, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/833,032

(22) Filed: Jul. 9, 2010

(65) Prior Publication Data

US 2012/0010324 A1    Jan. 12, 2012

(51) Int. Cl.
| | |
|---|---|
| *C09K 8/00* | (2006.01) |
| *C04B 7/00* | (2006.01) |
| *C04B 24/00* | (2006.01) |
| *C09K 8/46* | (2006.01) |
| *C04B 28/02* | (2006.01) |
| *C09K 8/467* | (2006.01) |
| *C04B 103/00* | (2006.01) |

(52) U.S. Cl.
CPC .................. *C09K 8/46* (2013.01); *C04B 28/02* (2013.01); *C09K 8/467* (2013.01); *C04B 2103/0046* (2013.01)

(58) Field of Classification Search
CPC ...................................... C04B 28/02
USPC ....................................... 523/130
See application file for complete search history.

(56) References Cited

U.S. PATENT DOCUMENTS

| | | | |
|---|---|---|---|
| 3,256,219 A | * | 6/1966 | Will ................................ 521/62 |
| 3,926,886 A | | 12/1975 | Kelley et al. |
| 3,981,835 A | * | 9/1976 | van Dyke ..................... 523/130 |
| 4,015,991 A | | 4/1977 | Persinski et al. |
| 4,204,988 A | | 5/1980 | Crouzet |
| 4,303,768 A | | 12/1981 | Blount |
| 4,426,243 A | | 1/1984 | Briggs |
| 4,504,318 A | * | 3/1985 | Matsuda et al. .................. 524/5 |
| 4,515,635 A | | 5/1985 | Rao et al. |
| 4,522,953 A | | 6/1985 | Barby et al. |
| 4,555,269 A | | 11/1985 | Rao et al. |
| 4,676,317 A | | 6/1987 | Fry et al. |

(Continued)

FOREIGN PATENT DOCUMENTS

WO       2012004568 A1    1/2012

OTHER PUBLICATIONS

Wang Zhihong, Han Yucui, Hua Yuan, "Research on increasing effect of solution polymerization for cement-based composite," Cement and Concrete Research, Apr. 7, 2003, pp. 1655-1658, vol. 33, Issue 10, Elsevier Ltd.

(Continued)

*Primary Examiner* — David Karst
(74) *Attorney, Agent, or Firm* — McDermott Will & Emery LLP; Craig Roddy

(57) ABSTRACT

The present invention relates to methods and compositions useful for isolating a portion of a wellbore. In one embodiment, a method includes preparing a sealant composition containing two phases. The sealant composition is placed into the wellbore where one phase sets upon subjecting the sealant composition to a thermal source followed by the setting of the other phase.

18 Claims, 6 Drawing Sheets

(56) References Cited

U.S. PATENT DOCUMENTS

| | | |
|---|---|---|
| 4,676,832 A | 6/1987 | Childs et al. |
| 4,703,801 A | 11/1987 | Fry et al. |
| 5,204,988 A | 4/1993 | Sakurai |
| 5,339,903 A | 8/1994 | Eoff et al. |
| 5,658,380 A | 8/1997 | Dillenbeck, III |
| 5,672,203 A * | 9/1997 | Chatterji et al. .............. 106/808 |
| 5,875,844 A | 3/1999 | Chatterji et al. |
| 5,875,845 A | 3/1999 | Chatterji et al. |
| 5,945,387 A | 8/1999 | Chatterji et al. |
| 6,068,055 A | 5/2000 | Chatterji et al. |
| 6,268,406 B1 | 7/2001 | Chatterji et al. |
| 6,508,305 B1 | 1/2003 | Brannon et al. |
| 7,259,130 B2 * | 8/2007 | Griffith et al. ................ 507/267 |
| 7,267,169 B2 | 9/2007 | Powell et al. |
| 8,770,291 B2 | 7/2014 | Shirshova et al. |
| 2003/0200903 A1 | 10/2003 | Mattus |
| 2004/0092656 A1 * | 5/2004 | Vogel et al. .................. 524/589 |
| 2005/0167106 A1 | 8/2005 | Reddy et al. |
| 2006/0122071 A1 | 6/2006 | Reddy et al. |
| 2006/0183820 A1 * | 8/2006 | Asano et al. ..................... 524/5 |
| 2008/0149328 A1 | 6/2008 | Lee |
| 2009/0158970 A1 * | 6/2009 | Andersen et al. ............ 106/817 |

OTHER PUBLICATIONS

International Preliminary Report on Patentability for PCT/GB2011/001030 dated Jan. 24, 2013.

Official Action for Canadian Patent Application No. 2,804,694 dated Apr. 28, 2014.

International Search Report and Written Opinion received in corresponding PCT Application PCT/GB2011/001029, dated Oct. 26, 2011.

* cited by examiner

US 9,441,147 B2

HYBRID CEMENT SET-ON-COMMAND COMPOSITIONS

FIELD OF THE INVENTION

The present invention generally relates to cement compositions and more particularly to compositions and methods that allow for greater control over the setting of fluids or slurries used in hydrocarbon exploration and production operations, such as subterranean cementing operations.

BACKGROUND OF THE INVENTION

Natural resources such as oil and gas located in a subterranean formation can be recovered by drilling a wellbore down to the subterranean formation, typically while circulating a drilling fluid in the wellbore. After the wellbore is drilled, a string of pipe, e.g., casing, can be run in the wellbore. The drilling fluid is then usually circulated downwardly through the interior of the pipe and upwardly through the annulus between the exterior of the pipe and the walls of the wellbore, although other methodologies are known in the art.

Cement is a unique material, which via a chemical reaction with water, transforms into a product having exceptional mechanical properties. In usual applications, cement slurry is formed by mixing cement and water, which results in a chemical reaction. In an early stage of the reaction, the cement slurry can be shaped into a required shape. The shaping property of the cement slurry allows for the use of cement in a wide range of industrial applications, including civil engineering and the oil and gas industry.

Hydraulic cement compositions are commonly employed in the drilling, completion and repair of oil and gas wells. For example, hydraulic cement compositions are utilized in primary cementing operations whereby strings of pipe such as casing or liners are cemented into wellbores. In performing primary cementing, a hydraulic cement composition is pumped into the annular space between the walls of a wellbore and the exterior surfaces of a pipe string disposed therein. The cement composition is allowed to set in the annular space, thus forming an annular sheath of hardened substantially impermeable cement. This cement sheath physically supports and positions the pipe string relative to the walls of the wellbore and bonds the exterior surfaces of the pipe string to the walls of the wellbore. The cement sheath prevents the unwanted migration of fluids between zones or formations penetrated by the wellbore. Hydraulic cement compositions are also commonly used to plug lost circulation and other undesirable fluid inflow and outflow zones in wells, to plug cracks and holes in pipe strings cemented therein and to accomplish other required remedial well operations. After the cement is placed within the wellbore a period of time is needed for the cement to cure and obtain enough mechanical strength for drilling operations to resume. This down time is often referred to as "waiting-on-cement", or WOC. If operations are resumed prior to the cement obtaining sufficient mechanical strength, the structural integrity of the cement can be compromised.

Two common pumping methods have been used to place the cement composition in the annulus. The cement composition may be pumped down the inner diameter of the casing and up through the annulus to its desired location. This is referred to as a conventional-circulation direction method. Alternately, the cement composition may be pumped directly down the annulus so as to displace well fluids present in the annulus by pushing them up into the inner diameter of the casing. This is referred to as a reverse-circulation direction method. Cement can also be used within the wellbore in other ways, such as by placing cement within the wellbore at a desired location and lowering a casing string into the cement. The latter method may be used, for example, when there is not the ability to circulate well fluids due to fluid loss into a formation penetrated by the wellbore.

In carrying out primary cementing as well as remedial cementing operations in wellbores, the cement compositions are often subjected to high temperatures, particularly when the cementing is carried out in deep subterranean zones. These high temperatures can shorten the thickening times of the cement compositions, meaning the setting of the cement takes place before the cement is adequately pumped into the annular space. Therefore, the use of set retarding additives in the cement compositions has been required. These additives extend the setting times of the compositions so that adequate pumping time is provided in which to place the cement into the desired location.

While a variety of cement set retarding additives have been developed and utilized, known additives, such as sugars or sugar acids, can produce unpredictable results. Hydroxy carboxylic acids, such as tartaric acid, gluconic acid and glucoheptonic acid are commonly used in oil well cementing as a cement retarder. However, if an excess of hydroxy carboxylic acid, or any other retarder, is used it can over-retard the set of the cement slurry and thereby causing it to remain fluid for an extended period of time. This over-retardation can result in extended waiting time prior to resuming drilling and may allow gas to invade the slurry thereby causing unwanted gas migration. The extended waiting time results in delays in subsequent drilling or completion activities.

In a number of cementing applications, aqueous salt has been utilized as an additive in cement compositions. The salt, generally sodium chloride, functions as a dispersant in cement slurry, causing the slurry to expand upon setting whereby the attainment of a good bond between the wellbore and casing upon setting of the slurry is enhanced. However, salt saturated slurries can cause problems to bordering formations, and in certain situations salt can be leached out of the cement slurry, which could cause cement failure. Also, certain salts, such as calcium salts, can act as accelerating agents if added in sufficient amounts, which can reduce the setting time of the cement composition. However, the presence of a set and strength accelerating agent, such as calcium salt, in the cement composition increases the risk that the cement composition may thicken or set before placement. Given the complexity of the cement chemistry and the large temperature and pressure gradients that can be present in the wellbore, and the difficulty in predicting the exact downhole temperatures during the placement and setting of the cement, it can be difficult to control the retarding additive and accelerating agent to get the desired setting behavior. Systems generally are over-engineered to have very long setting (or thickening) times in order to ensure that the mix remains fluid until all of the cementitious material is in place which can result in excessive WOC.

Therefore, there is a need for a new cement containing material as well as improved set control methods, which bring about predictable cement composition setting times in the subterranean environments encountered in wells in addition to lowered WOC. In particular, it is desirable to develop methods for rapidly setting cement-based systems whereby the timing of the setting is under the control of technicians in the field without the risk of premature setting. Thus, a need exists for a method of cementing a wellbore that would simultaneously contain sufficient retarder material to ensure proper pumpability for the desired pumping duration and a sufficient concentration of an accelerator to shorten the setting time, whereby the thickening effect of the accelerator is under the control of technicians in the field.

SUMMARY OF THE INVENTION

The present invention generally relates to wellbore fluid and/or slurry compositions that allow for greater control over the setting of such compositions in a wellbore.

Disclosed herein is a sealant composition in the form of an emulsion containing an organic phase and an aqueous phase. The sealant composition can include one or more components selected from sealants, resins, cements, settable drilling muds, conformance fluids, and combinations thereof. The aqueous phase can include a cement slurry containing cement and water. The cement slurry may also contain a set modifier. The set modifier can include one or more components selected from an accelerator, an oxidizing agent, a set retarder or combinations thereof. The organic phase can be a polymerizable organic continuous phase, or monomer phase, which is capable of being polymerized into a rigid material. The resulting polymer is a porous structure that acts as a scaffold for the cement slurry, holding the cement slurry in place until the cement slurry eventually sets. After the final setting of the cement, the resulting composition may include two interpenetrating networks: a network of a porous polymer structure containing a network of set cement. After setting, the resulting composition may include multiple non-continuous networks of set cement. In an aspect, the resulting composition may include a continuous network of set cement. Alternately the organic phase can be a thermo-setting resin that is capable of setting into a rigid material.

The organic phase can include non-water soluble liquid monomers, functionalized polymers, oligomers, resins or combinations thereof. The monomer component can include vinyl monomers. In an aspect the monomer can include, but is not limited to: methyl acrylate, ethyl acrylate, butyl acrylate, methylstyrene, styrene, methyl methacrylate or combinations thereof. The monomers may be polymerizable upon the addition of an initiator, upon being subjected to sufficient thermal energy. The organic phase may also include one or more selected from a crosslinking agent, a surfactant, a stabilizer, an initiator and combinations thereof.

Also disclosed herein is a method of isolating a portion of a wellbore by preparing a sealant composition, optionally in the form of an emulsion, containing an organic phase and an aqueous phase. The sealant composition is placed into a wellbore and allowed to set in the wellbore. The setting of the sealant composition in the wellbore can be accomplished in two stages, wherein the organic phase is set first followed by the setting of the aqueous phase. The organic phase may include one or more selected from a crosslinker, a surfactant, a stabilizer, an initiator and combinations thereof.

The stage of setting the organic phase can include the polymerization of the organic phase. The polymerization of the organic phase can be initiated by adding a polymerization initiator to the organic phase and by subjecting the organic phase to thermal energy. Alternately the setting of the organic phase can include the setting of a thermo-setting resin with the input of thermal energy.

In an embodiment the polymerization of the organic phase can be initiated by the addition of an initiator. The initiator can be selected to initiate the polymerization of the organic phase at a temperature of at least a portion of the wellbore, such as at a portion having an elevated temperature, for example the portion of the wellbore that has the highest temperature. The initiator can be chosen based on the wellhead temperature. The initiator may also be selected having a higher decomposition temperature than the temperature in the wellhead to avoid premature polymerization. In an aspect the initiator may be selected from the group consisting of, but not limited to: azo-initiators such as 2,2'-azobis(4-methoxy-2,4-dimethylvaleronitrile), 2,2'-azobis(2,4-dimethylvaleronitrile), 2,2'-azobisisobutyronitrile, dimethyl 2,2'-azobisisobutyrate, 2,2'-azobis(2-methylbutyronitrile), 1,1'-azobis(1-cyclohexanecarbonitrile), 2-(carbamoylazo)isobutyronitrile, 2,2'-azobis(2,4,4-trimethylpentane), 2-phenylazo-2,4-dimethyl-4-methoxyvaleronitrile, and 2,2'-azobis(2-methylpropane) and combinations thereof. Other initiators can include peroxy-initiators such as persulfates, benzoyl peroxide, tert-butyl peroxide, and combinations thereof.

The polymerization of the organic phase can be initiated by subjecting the organic phase to thermal energy. In an embodiment the thermal energy is supplied by an outside source, such as a heating element, which may be under the control of employees in the field. In another embodiment, the thermal energy is supplied by naturally occurring thermal energy present in the wellbore.

The aqueous phase of the method of the current invention includes hydraulic cement and sufficient water to form a slurry. The method can also include the step of adding additives to the slurry prior to placing the slurry into a wellbore. The additives can include an accelerator, a set retarder or combinations thereof.

The preceding has outlined rather broadly the features and technical advantages of the present invention in order that the detailed description of the invention may be more fully understood. The features and technical advantages of the present invention will be readily apparent to those skilled in the art upon a reading of the detailed description of the embodiments of the invention, which follows.

DETAILED DESCRIPTION

The present invention relates generally to wellbore operations involving fluids or slurries, and more particularly, to fluids or slurries that contain accelerating agents and/or retarders that can be released, activated and/or deactivated on command to provide thickening to the fluid or slurry. The fluids or slurries referred to herein can be any suitable for wellbore operations, drilling, completion, workover or production operations such as cements, drilling muds, lost circulation fluids, fracturing fluids, conformance fluids, sealants, resins, etc. One embodiment of the present invention relates to wellbore cementing operations, and more particularly, to methods of cementing in wellbores using sealant compositions having two phases.

The sealant compositions disclosed herein generally contain an organic phase including a monomer component and an aqueous phase including water and a cement component such as hydraulic cement, which can include calcium, aluminum, silicon, oxygen, and/or sulfur that sets and hardens by reaction with the water.

Figure 1:
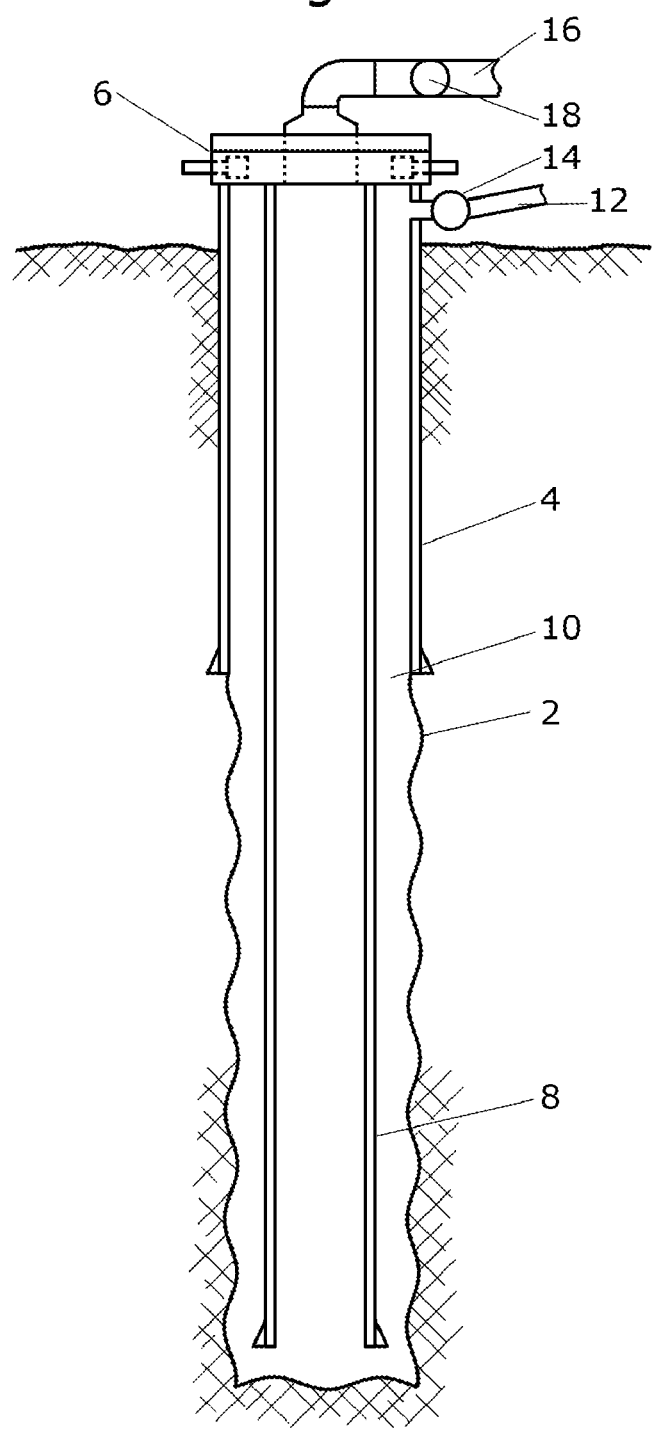
FIG. 1 illustrates a cross sectional side view of a wellbore.

Referring to FIG. 1, a cross sectional side view of an embodiment of a wellbore 2 is illustrated. Surface casing 4, having a wellhead 6 attached, is installed in the wellbore 2. Casing 8 is suspended from the wellhead 6 to the bottom of the wellbore 2. An annulus 10 is defined between casing 8 and the wellbore 2. Annulus flow line 12 fluidly communicates with annulus 10 through the wellhead 6 and/or surfacing casing 4 with an annulus valve 14. Flow line 16 is connected to the wellhead 6 to allow fluid communication with the inner diameter of casing 8 and a casing valve 18. At the lower most end of casing 8 the casing is open to the wellbore 2 or has circulation ports in the walls of casing 8 (not shown) to allow fluid communication between the annulus 10 and the inner diameter of casing 8.

A sealant composition can be pumped down the casing 8 and circulated up the annulus 10 while fluid returns are taken from the annulus 10 out flow line 12, in a typical circulation direction. Alternately the sealant composition can be pumped into the annulus 10 from annulus flow line 12 while fluid returns are taken from the inner diameter of casing 8 through flow line 16. Thus, fluid flows through wellbore 2 in a reverse circulation direction.

In one method a fluid composition, such as a sealant composition, can be placed within the wellbore 2 and a sealed or filled tubular, such as casing 8, can be lowered into the wellbore 2 such that the fluid composition is displaced into the annulus 10 area, thereby placing the fluid composition within the annulus 10 without pumping the fluid composition into the annulus 10. The above method can be referred to as puddle cementing. The fluid composition can be a drilling fluid placed within the wellbore after drilling operations are complete.

Any cement suitable for use in subterranean applications may be suitable for use in the present invention. In certain embodiments, the sealant compositions used in the present invention include hydraulic cement. Examples of hydraulic cements include but are not limited to Portland cements (e.g., Classes A, C, G, and H Portland cements), pozzolana cements, gypsum cements, phosphate cements, high alumina content cements, silica cements, high alkalinity cements, and combinations thereof. Cements including shale, cement kiln dust or blast furnace slag also may be suitable for use in the present invention. In certain embodiments, the shale may include vitrified shale; in certain other embodiments, the shale may include raw shale (e.g., unfired shale), or a mixture of raw shale and vitrified shale.

The sealant compositions used in the present invention generally include an aqueous-based base fluid and a nonaqueous-based base fluid. The aqueous-based base fluid may include water that may be from any source, provided that the water does not contain an excess of compounds (e.g., dissolved organics, such as tannins) that may adversely affect other compounds in the cement compositions. For example, a cement composition useful with the present invention can include fresh water, salt water (e.g., water containing one or more salts dissolved therein), brine (e.g., saturated salt water), or seawater. The nonaqueous-based base fluid may include any number of organic liquids. Examples of suitable organic liquids include, but are not limited to, mineral oils, synthetic oils, esters, and the like. The nonaqueous-based base fluid may include a monomer component. In an embodiment, the monomer component includes, but is not limited to, liquid monomers that are not water-soluble. In a more specific embodiment, the monomers are vinyl monomers having an accessible polymerizable double bond. In an aspect the monomer can be selected from the group of methyl acrylate, ethyl acrylate, butyl acrylate, methylstyrene, styrene and methyl methacrylate and combinations thereof. The nonaqueous-based base fluid may include a low viscosity thermo-setting resin.

The aqueous-based base fluid and the nonaqueous-based base fluid are immiscible to each other when mixed, thus forming an aqueous internal phase and an organic external phase. The aqueous internal phase may be referred to as the aqueous phase and the organic external phase may be referred to as the organic phase and as an organic continuous phase. The aqueous-based base fluid may be present in the cement slurry in an amount sufficient to form a pumpable slurry. More particularly, the aqueous-based base fluid may be present in the cement slurry used in the present invention in an amount in the range of from about 25% to about 150% by weight of cement ("bwoc"). In certain embodiments the aqueous-based base fluid may be present in the cement slurry in the range of from about 30% to about 75% bwoc. In still other embodiments the aqueous-based base fluid may be present in the cement slurry in the range of from about 40% to about 60% bwoc. In still other embodiments the aqueous-based base fluid may be present in the cement slurry in the range of from about 35% to about 50% bwoc. The cement slurry may include a sufficient amount of water to form a pumpable cementitious slurry. The water may be fresh water or salt water, e.g., an unsaturated aqueous salt solution or a saturated aqueous salt solution such as brine or seawater.

As a non-limiting example the aqueous phase can include a low concentration salt electrolyte solution in an amount of about 0.5% to about 20% by volume of the aqueous phase and a cement slurry in an amount of about 75% to about 95% by volume of the aqueous phase. The aqueous phase can also include a set modifier. The set modifier can include an accelerator in an amount of from about 0.1% to about 20% by weight of the aqueous phase. The set modifier can also include an oxidizing agent in an amount of about 0.05% to about 5% by weight of the aqueous phase capable of attacking any set retarder present. The set modifier can include a set retarder in an amount from about 0.1% to about 10% by weight of the aqueous phase.

The sealant composition may be in the form of an emulsion containing an external phase and an internal phase. The external phase is the organic phase and the internal phase is the aqueous phase. In an aspect the internal phase is present in the emulsion in amounts of from about 50% to about 90% of the total volume of the emulsion. Alternatively, the internal phase is present in the emulsion in amounts of from about 60% to about 80% of the total volume of the emulsion. In an embodiment, the external phase is present in the emulsion in amounts of from about 10% to about 50% of the total volume of the emulsion. Alternatively, the external phase is present in the emulsion in amounts of from about 20% to about 40% of the total volume of the emulsion. In a more specific embodiment, the emulsion is a high internal phase emulsion. The high internal phase emulsion contains greater than 74% of the total volume of the emulsion.

The emulsion, containing an internal phase and an external phase, may have a certain volumetric ratio of internal phase to external phase. In an aspect the volumetric ratio of internal phase to external phase is of from 9:1 to 1:1. In another aspect the volumetric ratio of internal phase to external phase is of from 7:1 to 1:1. Alternatively, the volumetric ratio of internal phase to external phase is of from 5:1 to 1:1. Alternatively, the volumetric ratio of internal phase to external phase is of from 4:1 to 1.5:1.

Optionally, the aqueous phase fluid or slurry compositions used in the present invention may include a fluid loss control additive. A variety of fluid loss control additives may be suitable for use with the present invention, including, inter alia, fibers, flakes, particulates, modified guars, latexes, and 2-acrylamido-2-methylpropanesulfonic acid copolymers such as those that are further described in U.S. Pat. Nos. 4,015,991; 4,515,635; 4,555,269; 4,676,317; 4,703,801; 5,339,903; and 6,268,406, the entire disclosures of which are hereby incorporated herein by reference. Generally, the fluid loss control additive is present in the cement slurry used in the present invention in an amount sufficient to provide a desired degree of fluid loss control. More particularly, the fluid loss control additive may be present in the cement slurry used in the present invention in an amount in the range of from about 0.1% to about 10% bwoc. In certain embodiments, the fluid loss control additive is present in the cement slurry used in the present invention in an amount in the range of from about 0.2% to about 3% bwoc.

Optionally, the compositions used in the present invention also may include a mechanical-property modifier. Examples of suitable mechanical-property modifiers may include, inter alia, gases that are added at the surface (e.g., nitrogen), gas-generating additives that may generate a gas in situ at a desired time (e.g., aluminum powder or azodicarbonamide), hollow microspheres, elastomers (e.g., elastic particles including a styrene/divinylbenzene copolymer), high aspect ratio materials (including, inter alia, fibers), resilient graphitic materials, vapor/fluid-filled beads, matrix-sorbable materials having time-dependent sorption (initiated by, e.g., degradation), mixtures thereof (e.g., mixtures of microspheres and gases), or the like. In certain embodiments of the present invention, the optional mechanical-property modifier may include a latex.

In certain optional embodiments wherein microspheres are added to a fluid or slurry, such as cement compositions useful with the present invention, the microspheres may be present in the cement compositions in an amount in the range of from about 5% to about 75% bwoc. In certain embodiments of the present invention, the inclusion of microspheres in the cement compositions useful with the present invention may reduce the density of the cement composition.

In certain optional embodiments wherein one or more gas-generating additives are used as mechanical property modifiers in the aqueous phase fluid or slurry compositions used in the present invention, the one or more gas-generating additives may include, inter alia, aluminum powder that may generate hydrogen gas in situ, or they may include azodicarbonamide that may generate nitrogen gas in situ. Certain initiators can also generate gases in situ such as azo-initiators and peroxides. Other gases and/or gas-generating additives also may be suitable for inclusion in the fluid or slurry compositions used in the present invention. Where included, a gas-generating additive may be present in aqueous phase cement compositions in an amount in the range of from about 0.1% to about 5% bwoc. In certain embodiments where the gas-generating additive is aluminum powder, the aluminum powder may be present in the aqueous phase cement compositions in an amount in the range of from about 0.1% to about 1% bwoc. In certain embodiments where the gas-generating additive is an azodicarbonamide, the azodicarbonamide may be present in the aqueous phase cement compositions in an amount in the range of from about 0.5% to about 5% bwoc.

Optionally, the aqueous phase fluid or slurry compositions used in the present invention also may include additional suitable additives, including defoaming agents, dispersants, density-reducing additives, surfactants, weighting materials, viscosifiers, fly ash, silica, free water control agents, and the like. Any suitable additive may be incorporated within the aqueous phase fluid or slurry compositions used in the present invention.

The aqueous phase fluid or slurry compositions used in the present invention can further include a set retarder. Set retarding admixtures lengthen the time at which the fluid or slurry composition remains a fluid. These retarding admixtures consequently allow a fluid or slurry, such as cement, to be pumped along long distances without the effect of premature setting. A broad variety of set retarders may be suitable for use in the fluid or slurry compositions used in the present invention. For example, the set retarder may include, inter alia, phosphonic acid, phosphonic acid derivatives, lignosulfonates, salts, sugars, carbohydrate compounds, organic acids, carboxymethylated hydroxyethylated celluloses, synthetic co- or ter-polymers including sulfonate and carboxylic acid groups, and/or borate compounds. In certain embodiments, the set retarders used in the present invention are phosphonic acid derivatives, such as those described in U.S. Pat. No. 4,676,832, the entire disclosure of which is hereby incorporated herein. Examples of suitable borate compounds include, but are not limited to, sodium tetraborate and potassium pentaborate. Examples of suitable organic acids include, inter alia, gluconic acid and tartaric acid. Generally, the set retarder is present in the aqueous phase fluid or slurry compositions used in the present invention in an amount sufficient to delay the setting of the fluid or slurry composition in a subterranean formation for a desired time. More particularly, the set retarder may be present in the aqueous phase fluid or slurry compositions used in the present invention in an amount in the range of from about 0.1% to about 10% bwoc. In certain embodiments, the set retarder is present in the aqueous phase fluid or slurry compositions used in the present invention in an amount in the range of from about 0.5% to about 4% bwoc.

The slurry compositions of the present invention may also include an accelerator. The accelerator aids in overcoming possible delays caused by the set retarders by shortening the setting time of the fluid or slurry composition. A broad variety of accelerators may be suitable for use in the fluid or slurry compositions used in the present invention, the accelerator may include any component that reduces the setting time of a cement composition. For example, the accelerator may include alkali and alkaline earth metal salts, silicate salts, aluminates and amines, such as triethanolamine. In an embodiment, the accelerator can include a calcium salt, a sodium salt, or combinations thereof. The calcium salt may be selected from the group consisting of calcium formate, calcium nitrate, calcium nitrite and calcium chloride. The sodium salt can include sodium sulfate. In a specific embodiment, the accelerator is calcium chloride. The accelerator may be present in the fluid or slurry compositions used in the present invention in an amount in the range of from about 0.1% to about 20% bwoc. In certain embodiments, the accelerator is present in the cement slurry used in the present invention in an amount in the range of from about 4% to about 12% bwoc. The nonaqueous-based base fluid, or organic phase, of the invention may include but is not limited to a monomer component. In an embodiment, the monomer component includes liquid monomers that are not water-soluble. In a more specific embodiment, the monomers are vinyl monomers having an accessible polymerizable double bond. In an aspect the monomer can be selected from the group of methyl acrylate, ethyl acrylate, butyl acrylate, methylstyrene, styrene and methyl methacrylate and combinations thereof.

In an embodiment the nonaqueous-based base fluid, or organic phase, of the invention may include but is not limited to a low viscosity thermo-setting resin. The resin can be immiscible in water and can an epoxy type sealing composition that can harden such as those disclosed in U.S. Pat. Nos. 5,875,844; 5,875,845; and 6,068,055 to Chatterji et al. which are incorporated herein by reference. One non-limiting example of a low viscosity thermo-setting resin is available from Halliburton under the brand name Strata-Loc®.

The organic phase may also include but is not limited to a crosslinker, a surfactant, or an initiator, or combinations thereof. Crosslinking agents, or crosslinkers, are well known in the art and may include but are not limited to monomers having two or more polymerizable double bonds, such as divinylbenzene. The crosslinking agent may bond during polymerization and connect distinct monomers, thereby forming a crosslink between two monomer chains. Surfactants may include but are not limited to those suitable for forming w/o (water-in-oil) emulsions, such as Hypermer™ polymeric surfactants. Initiators may include but are not limited to azo-initiators such as 2,2'-azobis(4-methoxy-2,4-dimethylvaleronitrile), 2,2'-azobis(2,4-dimethylvaleronitrile), 2,2'-azobisisobutyronitrile, dimethyl 2,2'-azobisisobutyrate, 2,2'-azobis(2-methylbutyronitrile), 1,1'-azobis(1-cyclohexanecarbonitrile), 2-(carbamoylazo)isobutyronitrile, 2,2'-azobis(2,4,4-trimethylpentane), 2-phenylazo-2,4-dimethyl-4-methoxyvaleronitrile, or 2,2'-azobis(2-methylpropane) or combinations thereof. Other initiators can include peroxy-initiators such as persulfates, benzoyl peroxide, tert-butyl peroxide, and combinations thereof.

Figure 2:
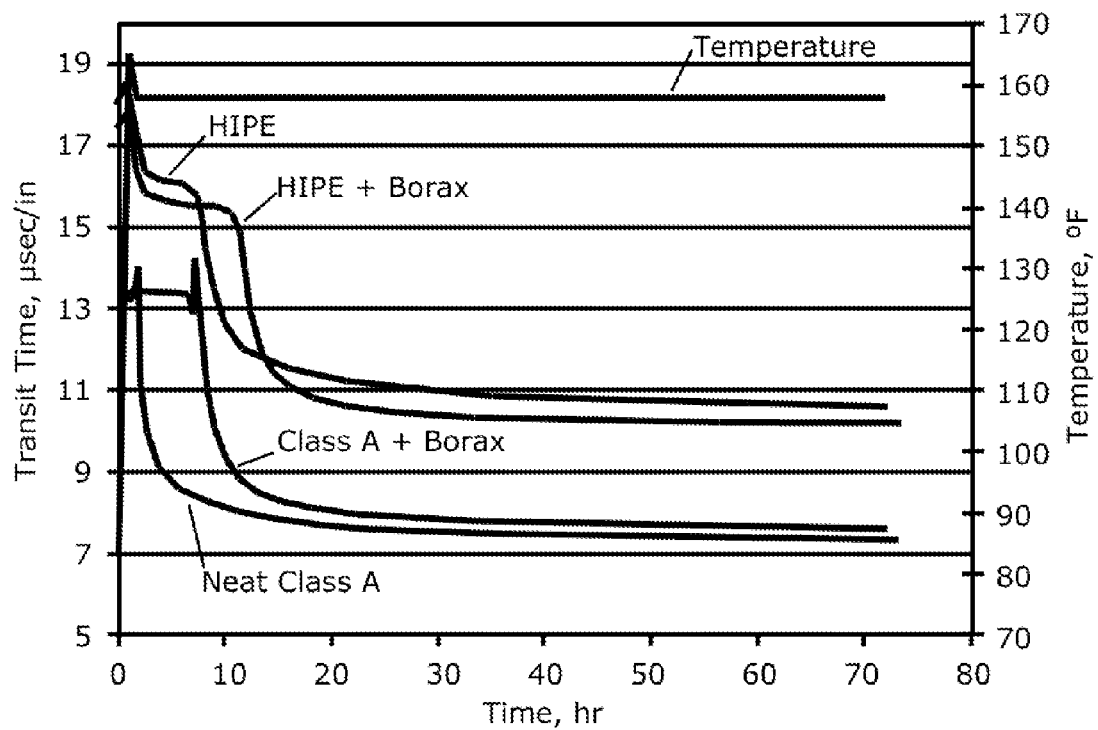
FIG. 2 compares the setting times of four cement mixtures at a constant temperature.

Referring to FIG. 2, a graph is depicted in FIG. 2 indicating the setting times of four samples. The setting times of each sample were conducted at the same temperature. The four samples include a neat cement mixture not containing the organic phase (Neat Class A), a cement mixture not containing an organic phase but containing a retarder (Class A+Borax), a cement mixture containing an organic phase (HIPE (high internal phase emulsion)), and a cement mixture containing an organic phase and a retarder (HIPE+Borax). In both samples not containing an organic phase, Neat Class A and Class A+Borax, once the setting is initiated, it continues until the composition is fully set. In both cases in which the samples contain an organic phase, HIPE and HIPE+Borax, a brief setting period occurs, in this case for about 1 to 2 hours, followed by a pause in the setting for about 5 hours, followed by the resumption of setting until the mixture is fully set. In addition, in both HIPE cases, the initial setting resulted in a 15-30% reduction in transit time (µsec/in.), with the remaining reduction in transit time occurring in the second setting (when the setting resumes). This first setting is a result of the polymerization of the monomer component of the organic phase. The polymerized organic phase acts as a scaffold or lattice that supports the cement slurry until the cement slurry finally sets. The scaffold structure can enable the continuation of drilling activities while the cement slurry is still setting. In addition, since the sealant composition is not fully set, errors can be corrected or alterations to a cementing procedure may be made prior to the full setting of the cement.

Figure 3:
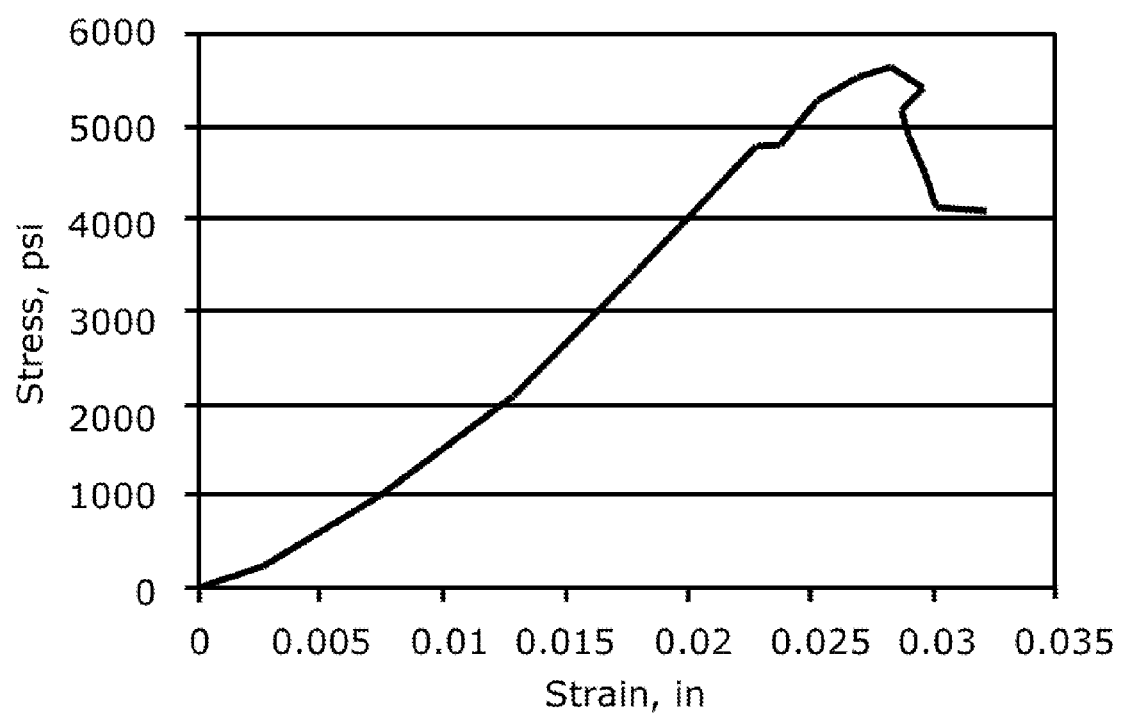
FIG. 3 represents a stress/strain curve of a neat cement sample.
Figure 4:
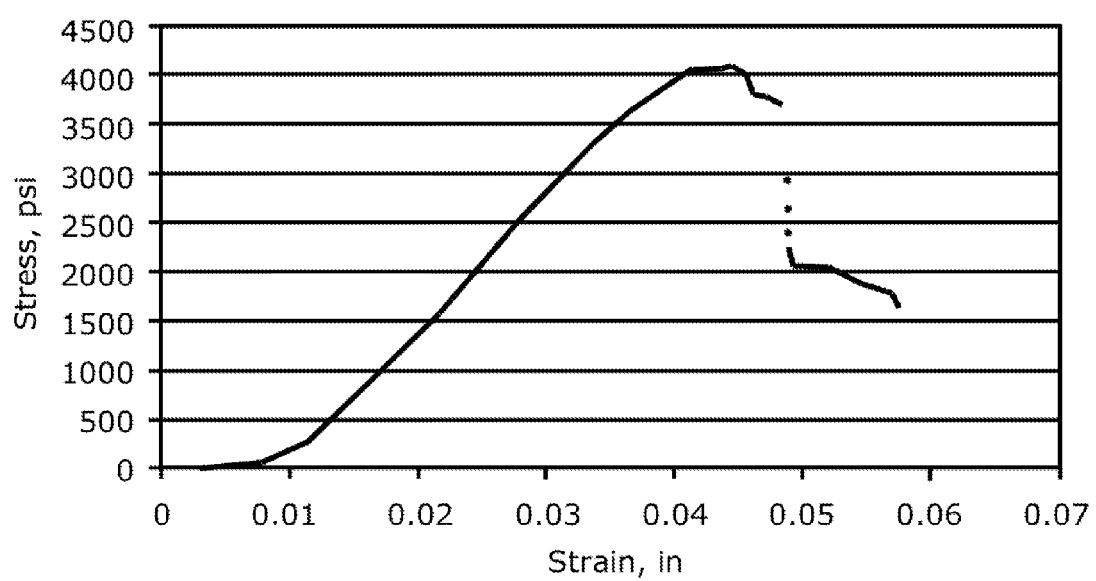
FIG. 4 represents a stress/strain curve of a HIPE cement sample.
Figure 5:
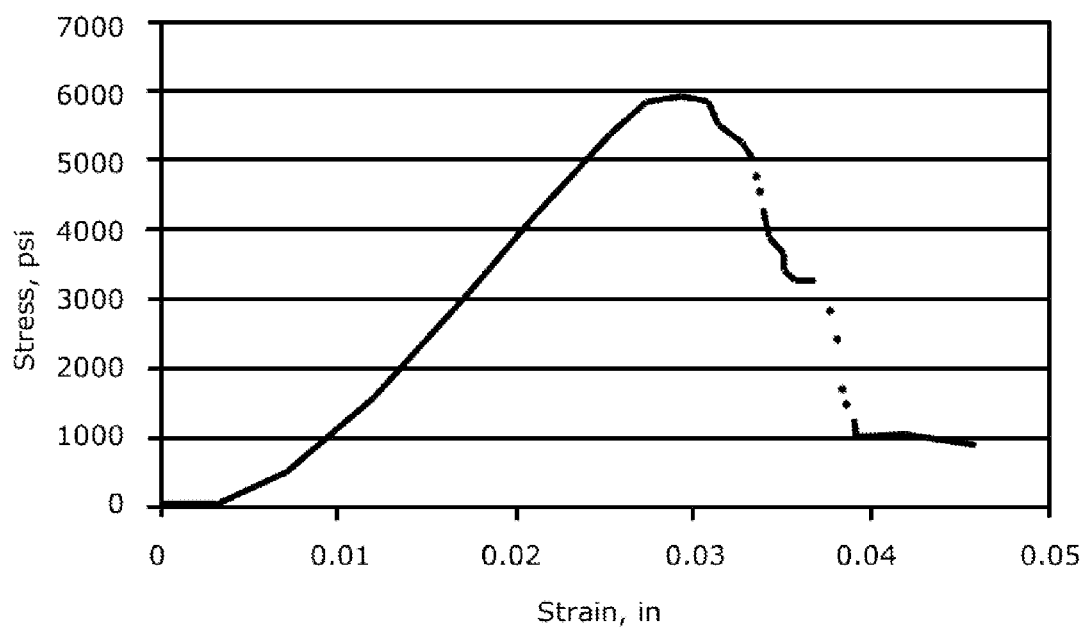
FIG. 5 represents a stress/strain curve of a neat cement sample with Borax.
Figure 6:
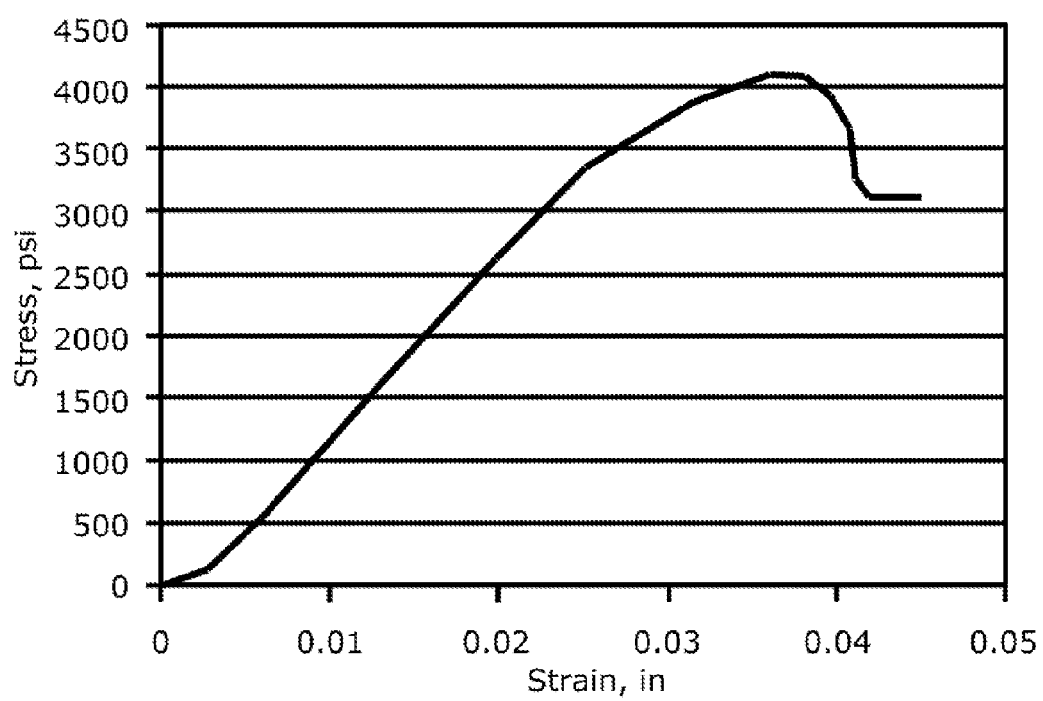
FIG. 6 represents a stress/strain curve of a HIPE cement sample with Borax.

FIGS. 3 and 4 illustrate a stress/strain curve of two cement samples. FIG. 3 illustrates a stress/strain curve of a neat cement sample. The stress/strain curve of FIG. 3 indicates that a neat cement composition has a breaking point at a stress of about 5500 psi and a breaking point at a strain of 0.03 inches. FIG. 4 illustrates a stress/strain curve of a HIPE cement sample. The stress/strain curve of FIG. 4 indicates that a HIPE cement composition has a breaking point at a stress of about 4000 psi and a breaking point at a strain of 0.045 inches. These figures indicate that the HIPE cement has a greater strain resistance and thus a higher resiliency to impact. Cement having a higher resiliency allows for greater protection of the casing/cement/wellbore bonding during working conditions.

Methods of this invention for isolating a portion of a wellbore may include forming a sealant composition having two phases and pumping the sealant composition into a wellbore. The two phases can include an aqueous phase and an organic phase, which are immiscible to each other. The aqueous phase and the organic phase may be prepared separately and later combined to form an emulsion. The sealant composition is placed into a wellbore and allowed to set into the wellbore. The setting of the sealant composition into the wellbore can be accomplished in two stages, wherein the organic phase is set first followed by the setting of the aqueous phase.

The stage of setting the organic phase can include the polymerizing of the organic phase. The polymerization of the organic phase can be initiated by adding a polymerization initiator to the organic phase, by subjecting the organic phase to thermal energy. The stage of setting the organic phase can be the first stage of the setting process. The set organic phase provides a polymeric component, which can act as a scaffold to support the unset cement slurry.

In an embodiment the polymerization of the organic phase can be initiated by the addition of an initiator. In a further embodiment the initiator is sufficient to initiate the polymerization of the organic phase. The initiator can be chosen based on the wellhead temperature. The initiator can be selected to initiate the polymerization of the organic phase at a temperature of at least a portion of the wellbore. In an embodiment, the initiator can be selected to initiate the polymerization of the organic phase at a temperature of at least a portion of the bottom half of the length of the wellbore. In another embodiment, the initiator can be selected to initiate the polymerization of the organic phase at a temperature of at least a portion of the top half of the length of the wellbore. The initiator may also be selected having a higher decomposition temperature than the temperature in the wellhead to avoid premature polymerization.

The polymerization of the organic phase can be initiated by subjecting the organic phase to thermal energy. In an embodiment the thermal energy is supplied by an outside source, such as a heating element, which may be under the control of employees in the field. The heating element may comprise high strength carbon fibers, which may be submerged into the emulsion that is placed into the wellbore. The thermal energy can be supplied by any suitable source, such as in the non-limiting examples of hydraulic forces; exothermic chemical reactions; and induction, resistance, and other electrical current methods that can generate heat. In another embodiment, the thermal energy is supplied by naturally occurring thermal energy present in the wellbore.

In an embodiment, the thermal energy is introduced under the control of a technician in the field. The technician, engineer, or other on-site employee, can have the control over the emission of thermal energy by sending a signal that causes a release of thermal energy from an emitter. In this embodiment, the thermal energy is released on demand from the technician in the field. The thermal energy can be released by a control system having parameters such as timer, flow meter, temperature sensor, or the like. In another embodiment, the lowering and/or emitting of the thermal energy source is triggered by a timing mechanism. In a further embodiment, the lowering and/or emitting of the thermal energy source is triggered by a flow meter that detects the amount of the intermixed composition delivered into the wellbore.

The aqueous phase of the method of the current invention includes hydraulic cement and sufficient water to form a slurry. The method can also include the step of adding an accelerator to the slurry, placing the slurry containing the accelerator into a wellbore. The accelerator can include a calcium salt, a sodium salt, or combinations thereof. In an embodiment, the accelerator can include $CaCl_2$ or $Na_2SO_4$ or combinations thereof. The accelerator can be added in an amount of from about 0.01% to about 20% by weight of cement. In another embodiment, the accelerator can be added in an amount of from about 0.2% to about 1% by weight of cement. The method can also include the step of adding a set retarder to the slurry before placing the slurry into a wellbore.

A medium phase (an emulsion containing an internal phase volume of 30-74 vol. %) to high phase (an emulsion containing an internal phase volume more than 74 vol. %) emulsion containing a liquid cement slurry may be formed by the drop-wise addition of an electrolyte solution, containing water and $CaCl_2$ or $Na_2SO_4$ or combinations thereof, but not limited by these examples, into the organic phase, followed by the fast addition of a cement slurry while the mixture is constantly stirred at a low first speed. The emulsion mixture is then stirred at a faster second speed. The first speed may range between about 100 to 700 rpm. The second speed may range between about 1000 to 2000 rpm.

Methods of this invention for isolating a wellbore may include forming a sealant composition that includes an emulsion of an aqueous phase that includes hydraulic cement and an organic phase that includes a monomer capable of polymerization, and including a set modifier, pumping the sealant composition containing the set modifier into a wellbore and subjecting the sealant composition to thermal energy after placement into the wellbore. The set modifier of the invention may be a retarder. The retarder of the invention can be susceptible to thermal energy or have a threshold temperature. The thermal energy introduced is sufficient to dissolve, or otherwise break down, the retarder thus allowing the setting of the sealant composition to proceed.

Alternate methods of this invention for isolating a wellbore may include forming a sealant composition that includes an emulsion of an aqueous phase that includes hydraulic cement and an organic phase that includes a low viscosity thermo-setting resin. The resin can be immiscible in water and can a hardenable epoxy type sealing composition such as those disclosed in U.S. Pat. Nos. 5,875,844; 5,875,845; and 6,068,055 to Chatterji et al. which are each incorporated herein by reference in their entirety. One non-limiting example of a low viscosity thermo-setting resin is available from Halliburton under the brand name Strata-Loc®.

EXAMPLES

Example 1

High internal phase emulsions (emulsions having an internal phase volume of 80%) were prepared in a glass reaction vessel equipped with a glass paddle rod connected to an overhead stirrer. The organic continuous phase of the emulsion contained 80 vol. % monomers (50:50 by volume monomer (styrene):crosslinker (divinylbenzene)), 20 vol. % of the surfactant (Hypermer™ 2296), and 1 mol % initiator (azobisisobutyronitrile, AIBN) with respect to the monomers. The initiator was first dissolved in half of the amount of monomer and then added to the rest of the organic phase. The addition of the internal phase was carried out in two steps: first, an aqueous solution containing 0.5 wt. % $CaCl_2$ was added dropwise into the organic phase while the mixture was stirred at a stirring rate of 400 rpm. The aqueous solution contained 14% of the total volume of the internal phase. Secondly, the cement slurry comprising the remaining 86% of the total volume of the internal phase was added slowly. The cement itself was prepared by adding dry cement and retarder (Borax) (in an amount of 0.3 wt. % of the cement weight) into water and homogenizing the mixture with an electric mixer for 35 seconds (the mixture had a cement/water ratio of 1/0.38 (aqueous phase contained only water)). After the entire internal phase was added into the organic phase, the stirring rate was increased to 1500 rpm for final homogenization.

For conventional polymerization, the prepared high internal phase emulsion cement hybrid (HIPECH) was transferred into plastic tubes, sealed and placed into an oven for 24 hours (although the polymerization was complete after 3-4 hours) at 70° C. for polymerization of the organic phase. For express polymerization, the prepared high internal phase emulsion cement hybrid (HIPECH) was transferred into a glass vessel. Carbon fibers (Toray™ M40B, 12000-50B), which were either submerged into the liquid HIPECH or wrapped around the glass vessel or steel pipe were used as resistance heaters to initiate the express polymerization process. Approximately 10-12 W (Watts) were used to polymerize a HIPECH volume of 30 $cm^3$. The polymerization, i.e. setting of the organic phase of the HIPECH, was complete after 80-90 min. The properties of the poly-HIPECH (polymerized HIPECH) obtained using express polymerization were compared with samples obtained using conventional thermal polymerization process.

Example 2

Medium internal phase emulsions (emulsions having an internal phase volume of 70 vol. %) were prepared in a glass reaction vessel equipped with a glass paddle rod connected to an overhead stirrer. The organic continuous phase of the emulsion contained 80 vol. % monomers (50:50 by volume monomer (styrene):crosslinker (divinylbenzene)), 30 vol. % of the surfactant (Hypermer 1031), and 1 mol % initiator (azobisisobutyronitrile, AIBN) with respect to the monomers. The initiator was first dissolved in half of the amount of monomer and added to the rest of the organic phase. The addition of the internal phase was carried out in two steps: first, an aqueous solution containing 0.5 wt. % $CaCl_2$ was added dropwise into the organic phase while the mixture was stirred at a stirring rate of 400 rpm. The aqueous solution contains 14 vol. % of the total volume of the internal phase. Secondly, the cement slurry comprising the remaining 86 vol. % of the total volume of the internal phase was added slowly. The cement itself was prepared by adding dry cement and retarder (Borax) (in an amount of 0.3 wt. % of the cement weight) into water and homogenizing the mixture with an electric mixer for 35 seconds (the mixture had a cement/water ratio of 1/0.38 (aqueous phase contained only water)). After the entire internal phase was added into the organic phase, the stirring rate was increased to 1500 rpm for final homogenization.

For conventional polymerization, the prepared high internal phase emulsion cement hybrid (HIPECH) was transferred into plastic tubes, sealed and placed into an oven for 24 hours (although the polymerization was complete after 3-4 hours) at 70° C. for polymerization of the organic phase. For express polymerization, the prepared high internal phase emulsion cement hybrid (HIPECH) was transferred into a glass vessel. Carbon fibers (Toray™ M40B, 12000-50B), which were either submerged into the liquid HIPECH or wrapped around the glass vessel or steel pipe were used as resistance heaters to initiate the express polymerization process. Approximately 10-12 W (Watts) were used to polymerize a HIPECH volume of 30 cm³. The polymerization, i.e. setting of the organic phase of the HIPECH, was complete after 80-90 min. The properties of the poly-HIPECH (polymerized HIPECH) obtained using express polymerization were compared with samples obtained using conventional thermal polymerization process.

Example 3

HIPE samples were prepared by obtaining a mixture of 24 ml of styrene, 24 ml of divinylbenzene, 12 ml of Hypermer™ 1031, and 0.54 g of azobisisobutyronitrile and adding to the mixture, by dropwise addition, 20 ml of 0.5% calcium chloride solution under a sufficient shear to emulsify. Next, a cement slurry prepared from 320 g of Class A cement and 120 g of water was slowly added to the mixture. After all the cement slurry was added, the shear was increased to about 7000 rpm and the mixture was blended for two minutes. The properties of the HIPE cement samples were compared with samples of traditional cement.

A test comparison involved the ultrasonic cement analysis of 4 samples. The first sample included HIPE cement. The second sample included HIPE cement with the addition of a set retarder (Borax). The third sample included neat cement and the fourth sample included neat cement with the addition of a set retarder (Borax). The results of these tests are indicated in FIG. 2. The results are also indicated in the tables below as follows:

TABLE 1

Ultrasonic Cement Analysis of HIPE Cement

| Elapsed Time (hrs) | Temp (° F.) | Pressure (psi) | Transit Time μsec/in. | Rate of Change in Transit Time μsec/in/hr. |
|---|---|---|---|---|
| 0.0 | 84 | 3133 | 18.1 | — |
| 1.0 | 165 | 3265 | 18.69 | +0.59 |
| 2.0 | 158 | 3506 | 16.49 | −2.2 |
| 3.0 | 158 | 3141 | 16.32 | −0.17 |
| 4.0 | 158 | 3197 | 16.2 | −0.12 |
| 5.0 | 158 | 3068 | 16.15 | −0.05 |
| 6.0 | 158 | 3044 | 16.08 | −0.07 |
| 7.0 | 158 | 3130 | 15.93 | −0.15 |
| 8.0 | 158 | 3162 | 15.22 | −0.71 |
| 9.0 | 158 | 3008 | 13.64 | −1.58 |
| 10.0 | 158 | 3253 | 12.73 | −0.91 |
| 11.0 | 158 | 3104 | 12.32 | −0.41 |

TABLE 1-continued

Ultrasonic Cement Analysis of HIPE Cement

| Elapsed Time (hrs) | Temp (° F.) | Pressure (psi) | Transit Time μsec/in. | Rate of Change in Transit Time μsec/in/hr. |
|---|---|---|---|---|
| 12.0 | 158 | 3042 | 12.06 | −0.26 |
| 13.0 | 158 | 3707 | 11.88 | −0.18 |
| 14.0 | 158 | 3170 | 11.75 | −0.13 |
| 15.0 | 158 | 3036 | 11.65 | −0.10 |
| 16.0 | 158 | 3141 | 11.56 | −0.09 |
| 17.0 | 158 | 3045 | 11.5 | −0.06 |
| 18.0 | 158 | 3062 | 11.43 | −0.07 |
| 19.0 | 158 | 3174 | 11.36 | −0.07 |
| 20.0 | 158 | 3069 | 11.31 | −0.05 |
| 21.0 | 158 | 3118 | 11.26 | −0.05 |
| 22.0 | 158 | 3017 | 11.22 | −0.04 |
| 23.0 | 158 | 3140 | 11.17 | −0.05 |

TABLE 2

Ultrasonic Cement Analysis of HIPE Cement with Borax

| Elapsed Time (hrs) | Temp (° F.) | Pressure (psi) | Transit Time μsec/in. | Rate of Change in Transit Time μsec/in/hr. |
|---|---|---|---|---|
| 0.0 | 78 | 3096 | 17.48 | — |
| 1.0 | 159 | 3279 | 17.9 | +0.5 |
| 2.0 | 158 | 3075 | 16.32 | −1.58 |
| 3.0 | 158 | 3067 | 15.88 | −0.44 |
| 4.0 | 158 | 3156 | 15.72 | −0.16 |
| 5.0 | 158 | 3030 | 15.66 | −0.06 |
| 6.0 | 158 | 3191 | 15.59 | −0.07 |
| 7.0 | 158 | 3128 | 15.57 | −0.02 |
| 8.0 | 158 | 3078 | 15.55 | −0.02 |
| 9.0 | 158 | 3035 | 15.52 | −0.03 |
| 10.0 | 158 | 3117 | 15.46 | −0.06 |
| 11.0 | 158 | 3208 | 15.23 | −0.23 |
| 12.0 | 158 | 3187 | 13.9 | −1.33 |
| 13.0 | 158 | 3055 | 12.40 | −1.50 |
| 14.0 | 158 | 3300 | 11.78 | −0.62 |
| 15.0 | 158 | 3119 | 11.41 | −0.37 |
| 16.0 | 158 | 3214 | 11.17 | −0.24 |
| 17.0 | 158 | 3147 | 11.01 | −0.16 |
| 18.0 | 158 | 3261 | 10.88 | −0.13 |
| 19.0 | 158 | 3123 | 10.79 | −0.09 |
| 20.0 | 158 | 3015 | 10.72 | −0.07 |
| 21.0 | 158 | 3104 | 10.65 | −0.07 |
| 22.0 | 158 | 3019 | 10.6 | −0.05 |
| 23.0 | 158 | 3144 | 10.56 | −0.04 |

TABLE 3

Ultrasonic Cement Analysis of Neat Class A Cement

| Elapsed Time (hrs) | Temp (° F.) | Pressure (psi) | Transit Time μsec/in. | Rate of Change in Transit Time μsec/in/hr. |
|---|---|---|---|---|
| 0.0 | 100 | 2787 | 13.08 | — |
| 1.0 | 160 | 3284 | 13.34 | +0.26 |
| 2.0 | 159 | 3500 | 12.84 | −0.50 |
| 3.0 | 158 | 3034 | 9.87 | −2.97 |
| 4.0 | 158 | 3026 | 9.15 | −0.72 |
| 5.0 | 158 | 3087 | 8.8 | −0.35 |
| 6.0 | 158 | 3130 | 8.59 | −0.21 |
| 7.0 | 158 | 3038 | 8.44 | −0.15 |
| 8.0 | 158 | 2995 | 8.33 | −0.11 |
| 9.0 | 158 | 2999 | 8.23 | −0.10 |
| 10.0 | 158 | 3019 | 8.13 | −0.10 |
| 11.0 | 158 | 3042 | 8.05 | −0.08 |

TABLE 3-continued

Ultrasonic Cement Analysis of Neat Class A Cement

| Elapsed Time (hrs) | Temp (° F.) | Pressure (psi) | Transit Time μsec/in. | Rate of Change in Transit Time μsec/in/hr. |
|---|---|---|---|---|
| 12.0 | 158 | 2995 | 7.99 | −0.06 |
| 13.0 | 158 | 3119 | 7.93 | −0.06 |
| 14.0 | 158 | 3001 | 7.88 | −0.05 |
| 15.0 | 158 | 3039 | 7.84 | −0.04 |
| 16.0 | 158 | 3050 | 7.8 | −0.04 |
| 17.0 | 158 | 3056 | 7.77 | −0.03 |
| 18.0 | 158 | 3109 | 7.73 | −0.04 |
| 19.0 | 158 | 3035 | 7.71 | −0.02 |
| 20.0 | 158 | 3108 | 7.68 | −0.03 |
| 21.0 | 158 | 3045 | 7.66 | −0.02 |
| 22.0 | 158 | 3155 | 7.64 | −0.02 |
| 23.0 | 158 | 3085 | 7.62 | −0.0 |

TABLE 4

Ultrasonic Cement Analysis of Neat Class A Cement with Borax

| Elapsed Time (hrs) | Temp (° F.) | Pressure (psi) | Transit Time μsec/in. | Rate of Change in Transit Time μsec/in/hr. |
|---|---|---|---|---|
| 0.0 | 76 | 27 | 32.08 | — |
| 1.0 | 158 | 3239 | 13.41 | −18.67 |
| 2.0 | 158 | 3196 | 13.41 | 0 |
| 3.0 | 158 | 3034 | 13.41 | 0 |
| 4.0 | 158 | 3184 | 13.4 | −0.01 |
| 5.0 | 158 | 3061 | 13.4 | 0 |
| 6.0 | 158 | 3120 | 13.39 | −0.01 |
| 7.0 | 158 | 3060 | 13.2 | −0.19 |
| 8.0 | 158 | 2995 | 12 | −1.2 |
| 9.0 | 158 | 2999 | 10.29 | −1.71 |
| 10.0 | 158 | 3064 | 9.43 | −0/86 |
| 11.0 | 158 | 3158 | 8.97 | −0.46 |
| 12.0 | 158 | 3000 | 8.71 | −0.26 |
| 13.0 | 158 | 3023 | 8.54 | −0.17 |
| 14.0 | 158 | 3182 | 8.41 | −0.13 |
| 15.0 | 158 | 3002 | 8.32 | −0.09 |
| 16.0 | 158 | 3019 | 8.25 | −0.07 |
| 17.0 | 158 | 3023 | 8.18 | −0.07 |
| 18.0 | 158 | 2999 | 8.13 | −0.05 |
| 19.0 | 158 | 3047 | 8.08 | −0.05 |
| 20.0 | 158 | 3086 | 8.04 | −0.04 |
| 21.0 | 158 | 2999 | 8.01 | −0.03 |
| 22.0 | 158 | 3165 | 7.98 | −0.03 |
| 23.0 | 158 | 3083 | 7.95 | −0.03 |

Another test comparison involved cement crush testing of 4 samples. The first sample included HIPE cement. The second sample included HIPE cement with the addition of a set retarder (Borax). The third sample included neat cement and the fourth sample included neat cement with the addition of a set retarder (Borax). The results of these tests are indicated in FIGS. 3 and 4. The results are also indicated in the tables below as follows:

TABLE 5

Crush Analysis of HIPE Cement

| Time (sec) | Position (in.) | Force (lb$_f$) | Stress (psi) |
|---|---|---|---|
| 0 | 0.0035 | 0.8303 | 0.2643 |
| 0.5 | 0.0042 | 6.941 | 2.209 |
| 1.016 | 0.0069 | 98.97 | 31.5 |
| 1.516 | 0.0094 | 444.6 | 141.53 |
| 2.02 | 0.0119 | 1099.7 | 350.1 |
| 2.5 | 0.0143 | 1905.4 | 606.5 |
| 3 | 0.0168 | 2888 | 919.2 |
| 3.5 | 0.0193 | 3962 | 1261.1 |
| 4 | 0.0218 | 5103 | 1624.4 |
| 4.52 | 0.0243 | 6365 | 2026 |
| 5 | 0.0267 | 7442 | 2369 |
| 5.5 | 0.0292 | 8556 | 2723 |
| 6 | 0.0318 | 9645 | 3070 |
| 6.5 | 0.0342 | 10670 | 3396 |
| 7 | 0.0367 | 11439 | 3641 |
| 7.5 | 0.0392 | 12211 | 3887 |
| 8.02 | 0.0419 | 12772 | 4066 |
| 8.5 | 0.0443 | 12865 | 4095 |
| 8.75 | 0.0456 | 12685 | 4038 |
| 9 | 0.0468 | 11936 | 3799 |
| 9.5 | 0.0493 | 6499 | 2069 |
| 10 | 0.0518 | 6369 | 2027 |

TABLE 6

Crush Analysis of HIPE Cement with Borax

| Time (sec) | Position (in.) | Force (lb$_f$) | Stress (psi) |
|---|---|---|---|
| 0 | 0.0001 | 2.937 | 0.935 |
| 1.031 | 0.0001 | 5.518 | 1.756 |
| 2.03 | 0.0005 | 36.03 | 11.469 |
| 3.02 | 0.0015 | 184.75 | 58.808 |
| 4.03 | 0.0027 | 465.7 | 148.237 |
| 5.03 | 0.0038 | 848 | 269.927 |
| 6.03 | 0.005 | 1284.9 | 408.996 |
| 7 | 0.0061 | 1752.9 | 557.965 |
| 8.03 | 0.0073 | 2266 | 721.29 |
| 9.03 | 0.0085 | 2797 | 890.313 |
| 10 | 0.0096 | 3331 | 1060.29 |
| 11.03 | 0.0108 | 3906 | 1243.318 |
| 12.03 | 0.0119 | 4482 | 1426.665 |
| 13.03 | 0.0131 | 5064 | 1611.921 |
| 14 | 0.0142 | 5634 | 1793.358 |
| 15.03 | 0.0154 | 6217 | 1978.933 |
| 16.03 | 0.0166 | 6780 | 2158.141 |
| 17.03 | 0.0177 | 7333 | 2334.166 |
| 18.02 | 0.0188 | 7868 | 2504.462 |
| 19.03 | 0.02 | 8409 | 2676.668 |
| 20 | 0.0212 | 8912 | 2836.778 |
| 21 | 0.0223 | 9370 | 2982.564 |
| 22 | 0.0235 | 9823 | 3126.758 |
| 23 | 0.0246 | 10254 | 3263.95 |
| 24 | 0.0258 | 10665 | 3394.775 |
| 25 | 0.0269 | 11026 | 3509.685 |
| 26 | 0.0281 | 11373 | 3620.138 |
| 27 | 0.0293 | 11687 | 3720.088 |
| 28 | 0.0304 | 11967 | 3809.214 |
| 29 | 0.0316 | 12222 | 3890.383 |
| 30 | 0.0328 | 12452 | 3963.595 |
| 31 | 0.0339 | 12646 | 4025.347 |
| 32 | 0.0351 | 12778 | 4067.364 |
| 33 | 0.0363 | 12868 | 4096.012 |
| 34 | 0.0375 | 12926 | 4114.474 |
| 35 | 0.0386 | 12653 | 4027.575 |
| 36 | 0.0398 | 12462 | 3966.778 |
| 37 | 0.0413 | 10347 | 3293.552 |
| 38 | 0.0422 | 9780 | 3113.071 |
| 39 | 0.0433 | 9795 | 3117.845 |
| 40 | 0.0445 | 9809 | 3122.302 |

TABLE 7

Crush Analysis of Neat Cement

| Time (sec) | Position (in.) | Force (lb$_f$) | Stress (psi) |
|---|---|---|---|
| 0 | 0 | — | — |
| 1.012 | — | — | — |
| 2.01 | 0.0003 | 65.57 | 20.872 |
| 3 | 0.0014 | 308.8 | 98.294 |
| 4.01 | 0.0026 | 713.2 | 227.019 |
| 5.01 | 0.0037 | 1213.3 | 386.205 |
| 6.01 | 0.0049 | 1760.6 | 560.416 |
| 7.02 | 0.006 | 2301 | 746.118 |
| 8.02 | 0.0072 | 2966 | 944.107 |
| 9.02 | 0.0083 | 3636 | 1157.375 |
| 10 | 0.0095 | 4346 | 1383.375 |
| 11.02 | 0.0107 | 5079 | 1616.696 |
| 12.02 | 0.0118 | 5858 | 1864.659 |
| 13.02 | 0.013 | 6667 | 2122.172 |
| 14.02 | 0.0141 | 7550 | 2403.24 |
| 15.02 | 0.0152 | 8487 | 2701.496 |
| 16.02 | 0.0164 | 9512 | 3027.764 |
| 17 | 0.0176 | 10541 | 3355.305 |
| 18.02 | 0.0187 | 11583 | 3686.983 |
| 19.02 | 0.0199 | 12644 | 4024.71 |
| 20 | 0.0211 | 13630 | 4338.564 |
| 21 | 0.0222 | 14534 | 4626.316 |
| 22 | 0.0235 | 15118 | 4812.209 |
| 23 | 0.0244 | 15887 | 5056.989 |
| 24 | 0.0257 | 16812 | 5351.426 |
| 25 | 0.0268 | 17387 | 5534.454 |
| 26 | 0.028 | 17616 | 5607.347 |
| 27 | 0.0296 | 17058 | 5429.73 |
| 28 | 0.0305 | 12768 | 4064.181 |
| 29 | 0.0316 | 12797 | 4073.412 |

TABLE 8

Crush Analysis of Neat Cement with Borax

| Time (sec) | Position (in.) | Force (lb$_f$) | Stress (psi) |
|---|---|---|---|
| 0 | 0.0001 | — | — |
| 1.031 | 0.0036 | 190.05 | 60.49 |
| 2.03 | 0.0085 | 2465 | 784.5 |
| 3.02 | 0.0135 | 6147 | 1956.5 |
| 4.02 | 0.0183 | 10552 | 3359 |
| 5.02 | 0.0234 | 15275 | 4862 |
| 6.02 | 0.0284 | 18568 | 5910 |
| 7.02 | 0.0342 | 12552 | 3995 |
| 8.03 | 0.0388 | 3275 | 1042.4 |
| 9.03 | 0.0436 | 2971 | 945.6 |

The term "cementitious composition" as may be used herein includes pastes (or slurries), mortars, and grouts, such as oil well cementing grouts, shotcrete, and cement compositions including a hydraulic cement binder. The terms "paste", "mortar" and "concrete" are terms of art: pastes are mixtures composed of a hydratable (or hydraulic) cement binder (usually, but not exclusively, Portland cement, Masonry cement, Mortar cement, and/or gypsum, and may also include limestone, hydrated lime, fly ash, granulated blast furnace slag, and silica fume or other materials commonly included in such cements) and water; "mortars" are pastes additionally including fine aggregate (e.g., sand), and "concretes" are mortars additionally including coarse aggregate (e.g., crushed rock or gravel). The cement compositions described in this invention are formed by mixing required amounts of certain materials, e.g., a hydraulic cement, water, and fine and/or coarse aggregate, as may be required for making a particular cementitious composition.

The term "accelerator" can include any component, which reduces the setting time of a cement composition. For example, the accelerator may include alkali and alkaline earth metal salts, such as a calcium salt. The calcium salt may include calcium formate, calcium nitrate, calcium nitrite or calcium chloride.

The term "oxidizer" can include any component which is capable of degrading the retarder present. These include, but are not limited to alkaline earth and zinc salts of peroxide, perphosphate, perborate, percarbonate; calcium peroxide, calcium perphosphate, calcium perborate, magnesium peroxide, magnesium perphosphate, zinc perphosphate, calcium hypochlorite, sodium persulfate, organic peroxides, organic hydroperoxides, magnesium hypochlorite; and mixtures thereof.

The term "retarder" or "set retarder" can include boronated or non-boronated forms of phosphonic acid, phosphonic acid derivatives, lignosulfonates, salts, sugars, carbohydrate compounds, organic acids, carboxymethylated hydroxyethylated celluloses, synthetic co- or ter-polymers including sulfonate and carboxylic acid groups, and/or borate compounds.

The term "set" as used herein refers to an increase in mechanical strength of a fluid or slurry sufficient to perform a desired result, such as to restrict movement of an item or impede fluid flow or pressure transfer through a fluid. A cement may be referred to as set when it can restrict the movement of a pipe, or impede fluid flow or pressure transfer, regardless of whether the cement has cured to a fully solid composition. A fluid or slurry can be referred to as set when it has thickened to a sufficient level that it achieves the desired result, such as the isolation of a particular zone or the restriction of fluid flow or pressure transfer, regardless of whether it has reached its final consistency.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

The invention claimed is:

1. A sealant composition, comprising:
    an emulsion of an aqueous phase and an organic phase, wherein an internal phase comprises the aqueous phase and an external phase comprises the organic phase, the volumetric ratio of the internal phase to the external phase being from 5:1 to about 9:1;

wherein the organic phase comprises a monomer and a crosslinking agent;

wherein the monomer is capable of polymerization to form a polymeric component;

wherein the organic phase sets prior to the setting of the aqueous phase upon subjecting the sealant composition to a thermal source;

wherein the aqueous phase comprises cement slurry present in an amount of about 75% to 85% by volume of the aqueous phase;

wherein the aqueous phase sets within the structure of the polymeric component;

wherein the sealant composition further comprises an initiator that can initiate the setting of the organic phase upon reaching a temperature threshold, and wherein the initiator is selected from the group consisting of 2,2'-azobis(4-methoxy-2,4-dimethylvaleronitrile), 2,2'-azobis(2,4-dimethylvaleronitrile), 2,2'-azobisisobutyrate, 2,2'-azobisisobutyronitrile, dimethyl 2,2'-azobisisobutyrate, 2,2'-azobis(2-methylbutyronitrile), 1,1'-azobis(1-cyclohexanecarbonitrile), 2-2(carboamoylazo)isobutyronitrile, 2,2'-azobis(2,4,4-trimethylpentane), 2-phenylazo-2,4-dimethyl-4-methoxyvaleronitrile, 2,2'-azobis(2-methylpropane), persulfates, benzoyl peroxide, and combinations thereof.

2. The sealant composition of claim 1, wherein the aqueous phase and the organic phase are immiscible with each other.

3. The sealant composition of claim 1, wherein the aqueous phase comprises a set modifier.

4. The sealant composition of claim 3, wherein the set modifier is selected from the group consisting of an accelerator, an oxidizing agent, a set retarder, and combinations thereof.

5. The sealant composition of claim 1, wherein subjecting the sealant composition to a thermal source initiates the polymerization of the monomer.

6. The sealant composition of claim 1, wherein the monomer is selected from the group consisting of methyl acrylate, ethyl acrylate, butyl acrylate, methylstyrene, styrene and methyl methacrylate and combinations thereof.

7. The sealant composition of claim 1, wherein subjecting the sealant composition to a thermal source alters the organic phase resulting in an increase in the mechanical strength of the sealant composition.

8. The sealant composition of claim 1, wherein the organic phase comprises a thermo-setting resin.

9. The sealant composition of claim 8, wherein subjecting the sealant composition to a thermal source initiates the setting of the thermo-setting resin.

10. The sealant composition of claim 1, wherein the initiator initiates the polymerization of the monomer to form a polymeric component.

11. The sealant composition of claim 1, wherein the initiator is selected to initiate the altering of the organic phase at a temperature of at least a portion of a wellbore.

12. A sealant composition, comprising:
an emulsion of an aqueous phase and an organic phase,
wherein an internal phase comprises the aqueous phase and an external phase comprises the organic phase, the volumetric ratio of the internal phase to the external phase being from 5:1 to about 9:1; and
a crosslinking agent and an initiator;

wherein the aqueous phase comprises cement slurry present in an amount of about 75% to 85% by volume of the aqueous phase;

wherein the organic phase comprises a monomer and/or a thermo-setting resin, and sets prior to the setting of the aqueous phase upon subjecting the sealant composition to a thermal source;

wherein subjecting the sealant composition to the thermal source results in polymerizing the monomer and/or setting the resin to form a polymeric component, resulting in an increase in the mechanical strength of the sealant composition;

wherein the aqueous phase sets within the structure of the polymeric component, and wherein the initiator can initiate the setting of the organic phase upon reaching a temperature threshold, and wherein the initiator is selected from the group consisting of 2,2'-azobis(4-methoxy-2,4-dimethylvaleronitrile), 2,2'-azobis(2,4-dimethylvaleronitrile), 2,2"-azobisisobutyrate, 2,2"-azobisisobutyronitrile, dimethyl 2,2'-azobisisobutyrate, 2,2'-azobis(2-methylbutyronitrile), 1,1'-azobis(1-cyclohexanecarbonitrile), 2-2(carboamoylazo)isobutyronitrile, 2,2'-azobis(2,4,4-trimethylpentane), 2-phenylazo-2,4-dimethyl-4-methoxyvaleronitrile, 2,2'-azobis(2-methylpropane), persulfates, benzoyl peroxide, and combinations thereof.

13. The sealant composition of claim 12, wherein the aqueous phase and the organic phase are immiscible with each other.

14. A sealant composition, comprising:
an emulsion of an aqueous phase comprising a cement slurry present in an amount of about 75% to 85% by volume of the aqueous phase, and an organic phase comprising an initiator, a crosslinking agent, and at least one of a monomer or a thermo-setting resin capable of setting prior to the setting of the aqueous phase upon subjecting the sealant composition to a thermal source, wherein an internal phase comprises the aqueous phase and an external phase comprises the organic phase, the volumetric ratio of the internal phase to the external phase being from 7:1 to about 9:1, and the aqueous and organic phases being immiscible with each other, wherein the organic phase sets prior to the setting of the aqueous phase upon subjecting the sealant composition to a thermal source, wherein subjecting the sealant composition to the thermal source results in polymerizing the monomer and/or setting the resin to form a polymeric component, which results in an increase in the mechanical strength of the sealant composition, wherein the aqueous phase sets within the structure of the polymeric component, wherein the initiator can initiate the setting of the organic phase upon reaching a temperature threshold, and wherein the initiator is selected from the group consisting of 2,2'-azobis(4-methoxy-2,4-dimethylvaleronitrile), 2,2'-azobis(2,4-dimethylvaleronitrile), 2,2'-azobisisobutyrate, 2,2'-azobisisobutyronitrile, dimethyl 2,2'-azobisisobutyrate, 2,2'-azobis(2-methylbutyronitrile), 1,1'-azobis(1-cyclohexanecarbonitrile), 2-2(carboamoylazo)isobutyronitrile, 2,2'-azobis(2,4,4-trimethylpentane), 2-phenylazo-2,4-dimethyl-4-methoxyvaleronitrile, 2,2'-azobis(2-methylpropane), persulfates, benzoyl peroxide, and combinations thereof.

15. The sealant composition of claim 14, wherein the initiator initiates the setting of the organic phase.

16. The sealant composition of claim 14, wherein the initiator initiates the setting of the organic phase upon reaching a temperature threshold.

17. The sealant composition of claim 14, wherein the initiator initiates the polymerization of the monomer to form a polymeric component.

18. The sealant composition of claim 14, wherein the initiator is selected to initiate the polymerization of the monomer in the organic phase at a temperature of at least a portion of a wellbore.

* * * * *